United States Patent [19]  [11] 4,010,180
Schiessler et al.  [45] Mar. 1, 1977

[54] PROCESS FOR THE PURIFICATION OF COPPER PHTHALOCYANINE

[75] Inventors: Siegfried Schiessler, Frankfurt am Main; Ernst Spietschka, Oberauroff, Taunus; Wolfgang Tronich, Frankfurt am Main, all of Germany

[73] Assignee: Hoechst Aktiengesellschaft, Frankfurt am Main, Germany

[22] Filed: Dec. 21, 1973

[21] Appl. No.: 427,316

[30] Foreign Application Priority Data

Dec. 22, 1972 Germany .......................... 2262895

[52] U.S. Cl. .......................................... 260/314.5
[51] Int. Cl.$^2$ ...................................... C09B 47/04
[58] Field of Search ............................. 260/314.5

[56] References Cited

UNITED STATES PATENTS

| | | | |
|---|---|---|---|
| 2,284,685 | 6/1942 | Detrick et al. | 260/314.5 |
| 2,365,464 | 12/1944 | Gross | 260/314.5 |
| 2,602,800 | 7/1952 | Barnhart | 260/314.5 |
| 2,917,518 | 12/1959 | Merner | 260/314.5 |
| 3,717,493 | 2/1973 | Griswold | 106/288 Q |
| 3,801,591 | 4/1974 | Jackson | 260/314.5 |

OTHER PUBLICATIONS

Chemical Abstracts, vol. 78, abst. No. 31416e (1973), (abst. of German Offen. 2,159,912).
Venkataraman, Chemistry of Synthetic Dyes, vol. V, p. 248 (1971).

*Primary Examiner*—John D. Randolph
*Attorney, Agent, or Firm*—Curtis, Morris & Safford

[57] ABSTRACT

A process for the purification of optionally substituted crude phthalocyanines wherein a phthalocyanine is introduced into a 84 to 88 % sulfuric acid, the phthalocyanine sulfate formed is subjected to a crystal growth at 60 – 100° C in an inert gas atmosphere, the phthalocyanine sulfate is isolated and the phthalocyanine is recovered by hydrolysis with water. By this process a phthalocyanine sulfate is formed in a coarse crystalline form which can easily be filtered and which furtheron can easily be processed to a valuable pigment of the α-modification.

6 Claims, No Drawings

PROCESS FOR THE PURIFICATION OF COPPER PHTHALOCYANINE

The present invention relates to a novel process for the purification of crude copper phthalocyanine (CuPC) and for the preparation of pure copper phthalocyanine which can easily be converted into a particularly suitable pigment of the α-crystal modification.

It is known that copper phthalocyanine of the α-crystal modification may be prepared in a pure form by dissolving the crude dyestuff in concentrated sulfuric acid and subsequently pouring the solution into a large excess of water. It is also possible according to known processes to introduce copper phthalocyanine into a 60 to 90% sulfuric acid and to hydrolize the copper phthalocyanine sulfate formed in a great excess of water. The decisive disadvantage of these purification processes is that a large amount of strongly contaminated dilute sulfuric acid is obtained, which represents an intolerable charge for the waste water. A concentration of this large amount of dilute acid is not possible for economical reasons.

Furthermore it is known that copper phthalocyanine may be purified and converted into the α-modification by dissolving the dyestuff in sulfuric acid and subsequently reducing the concentration of sulfuric acid by addition of water so that the copper phthalocyanine precipitates in the form of the sulfate thereof and that this sulfate may be isolated by filtration. However, in this process the copper phthalocyanine sulfate is obtained in a form which can only be filtered with difficulties. Furthermore the filter cake is strongly thixotropic and still contains about 85% of sulfuric acid. Therefore, when washing the filter cake until neutral with water, a large amount of dilute sulfuric acid is also formed. Moreover, due to the bad filtering of the copper phthalocyanine sulfate and of the thixotropic character of the filter cake, this method of purification is not suitable for being applied on an industrial scale.

Surprisingly it has now been found that, in contradistinction to the method hitherto known, a coarse crystalline copper phthalocyanine sulfate which can easily be filtered is obtained when introducing copper phthalocyanine into a 84 to 88%, preferably 85.5 – 86.5% sulfuric acid and after-treating the suspension formed of the copper phthalocyanine sulfate for one to several hours at 60° – 100° C. It is also possible to dissolve the copper phthalocyanine first in a higher percentage sulfuric acid, subsequently to dilute it to a sulfuric acid concentration of 84 to 88%, preferably 85.5 to 86.5% by addition of the calculated amount of water, and to subject it to a heat-treatment.

Furthermore it has been found that the treatment by heat of the copper phthalocyanine sulfate has to be carried out in an inert gas atmosphere, in order to avoid a loss of the yield.

Furthermore it has been found that the copper phthalocyanine of the α-crystal modification obtained during the hydrolisis of the coarse crystalline copper phthalocyanine sulfate isolated also has excellent filtration properties and is, moreover, very suitable for the preparation of particularly valuable pigment of the α-modification as starting product.

When introducing the copper phthalocyanine into a 84 to 88% sulfuric acid according to the process claimed, the extremely finely crystalline copper phthalocyanine sulfate already known which can only be filtered with difficulties is also obtained first. In the course of the after-treatment of this copper phthalocyanine sulfate suspension at 60° – 100° C, a growth of the sulfate crystals to big regular crystals which can reach a size of up to 1 mm may be observed.

Parallel to this growth of crystals the at first very high viscosity of the copper phthalocyanine sulfate suspension is strongly reduced. The coarse crystalline copper phthalocyanine sulfate obtained according to the claimed process can be filtered 10 to 200 times faster than normal copper phthalocyanine sulfate. Furthermore, a granular filter cake is obtained which does not have any thixotropic properties and which is to a large extent free from mother liquor.

As starting product for the purification process claimed there may be considered unsubstituted copper phthalocyanine and halogenated copper phthalocyanine, preferably low-chlorinated copper phthalocyanine having a chlorine content of up to about 6%. Halogenation may have been effected in 3-position and/or in 4-position of the copper phthalocyanine. Above all may be used the so-called semichloro-copper phthalocyanine required for the preparation of pigments of the α-modification stable to recrystallization, which has a content of chlorine of about 3%.

The treatment with sulfuric acid may be applied to copper phthalocyanine or halogenated copper phthalocyanine, if these dyestuffs contain small amounts of phthalocyanines containing other central atoms or of substituted phthalocyanines, as far as these dyestuffs added are resistant to acid, and their sulfates have similar conditions of solubility to copper phthalocyanine, or as far as these dyestuffs can be incorporated into the crystal structure of the copper phthalocyanine sulfate.

Phthalocyanines having other central atoms are above all heavy metal phthalocyanines such as nickel, cobalt or iron phthalocyanine.

Substituted phthalocyanines are above all phthalocyanines having alkyl, aryl, carboxyl, sulfo, sulfonamide, alkylaminomethyl-phthalimidomethyl or chloromethyl groups.

For the purification of sulfuric acid there may be used crude copper phthalocyanine or halogenated copper phthalocyanine prepared according to the dinitrilic or phthalic acid anhydride process and products prepurified for example by boiling with dilute hydrochloric acid.

The sulfuric acid used for the formation of sulfate and the growth of the crystals must have a percentage of 84 to 88%, before being introduced into the copper phthalocyanine, but the best results are obtained when using a 85 to 87%, preferably 85.5 to 86.5% sulfuric acid. The percentage is by weight and refers to the initial concentration of the acid.

Since a small portion of the sulfuric acid is consumed by the formation of sulfate and by the action of impurities of the copper phthalocyanine, the concentration of sulfuric acid is reduced during the reaction. When using strongly contaminated copper phthalocyanine it may be necessary to use a somewhat more concentrated sulfuric acid.

It has turned out that the copper phthalocyanine sulfate, when using sulfuric acid with an initial concentration of less than 84% does not show any coarser crystals during the after-treatment at 60° – 100° C and that it yields, therefore, a copper phthalocyanine sulfate which can only be filtered with difficulties.

When using a more than 88% sulfuric acid, there is a certain coarsening of crystals, but since the solubility of copper phthalocyanine sulfate in sulfuric acid of this concentration range is too high, the concentration must be reduced before isolation by addition of water. In this process the copper phthalocyanine sulfate crystals are completely decomposed and again, a copper phthalocyanine sulfate with a very bad filtering property is obtained.

It is also possible to dissolve first the copper phthalocyanine or halogenated copper phthalocyanine in a 95 to 100% sulfuric acid or in dilute oleum and to dilute subsequently, if desired after filtering from acid-insoluble impurities, by addition of the calculated amount of water, to a sulfuric acid concentration of 84 to 88%, preferably 85.5 to 86.5%.

The subsequent after-treatment at 60° – 100° C also causes the desired growth of crystals of the copper phthalocyanine sulfate. The precipitation of the copper phthalocyanine sulfate by addition of water is carried out in this case at a temperature of 50° to 100° C; the water is expediently added at the temperature which is also desired for the growth of the crystals. A previous dissolution of the copper phthalocyanine is sulfuric acid is especially suitable in the case of strongly contaminated crude products. Furthermore, with low-halogenated copper phthalocyanine according to this process the most favorable results are often obtained.

The amount of sulfuric acid may be varied within wide limits, but it is suitable, for economical reasons, not to use more than 10 times the amount of sulfuric acid (calculated on copper phthalocyanine). Normally 4 to 10 times the amount of sulfuric acid is used.

The growth of the crystals in a 84 to 88% sulfuric acid takes place at a temperature of from 60° to 100° C. Higher temperatures are possible, but there is the risk that the copper phthalocyanine is decomposed.

At lower temperatures the growth of the crystals proceeds too slowly; a temperature range of 70 to 90 is most suitable.

The time of action depends on the temperature and ranges between 1 and 10 hours. At 60° C, the crystal growth takes 8 hours, whereas at 90° C only about 1 hour is required. At 70° – 80° C, within 2 to 5 hours, the transition from microcrystalline needles of the copper phthalocyanine sulfate to big crystals takes place.

When treating the copper phthalocyanine sulfate with sulfuric acid at 60° – 100° C, it has to be provided for the absence of air by inert gas, since otherwise a loss of yields of up to 15% by oxydation appears. Nitrogen is used above all as inert gas.

When the growth of crystals is finished the coarse crystalline copper phthalocyanine sulfate is isolated by filtration. The filtration can take place at the temperature at which the crystal growth took place, but the whole is expediently cooled to room temperature before filtration. Before filtration the sulfuric acid concentration may be reduced to about 80% by addition of water. The coarse crystalline filter cake of the copper phthalocyanine sulfate can also be freed from the mother liquor attached by washing with a 80 to 86% sulfuric acid. Due to the coarse crystalline character the filter cake contained 40 to 50% of copper phthalocyanine.

From the isolated copper phthalocyanine sulfate the copper phthalocyanine is set free by the action of water. For this purpose, the copper phthalocyanine sulfate may be directly washed with water until neutral. It is also possible to introduce the copper phthalocyanine sulfate into water and subsequently, to isolate the copper phthalocyanine formed and to wash it until neutral. The free copper phthalocyanine is obtained in a coarsely grained form and filtered very rapidly.

The process claimed has the advantage that due to the physical properties of the coarsely crystalline copper phthalocyanine sulfate, it is possible to purify the copper phthalocyanine via the copper phthalocyanine sulfate on an industrial scale. Hitherto this has been impossible because of the bad filtering and the thixotropic character of the product. The coarsely crystalline copper phthalocyanine sulfate may be isolated on the continuous and discontinuous filtration devices usual in commerce.

As filtration devices may be considered for example filter presses, drum filters or centrifuges. The technical filtration of the copper phthalocyanine of the $\alpha$-crystal modification formed during the hydrolisis from the copper phthalocyanine sulfate also proceeds very quickly due to the coarse-grained character.

A special advantage of the process is that filtration and washing of copper phthalocyanine sulfate and of copper phthalocyanine on an industrial scale may also be carried out continously due to the properties of the products.

Another advantage is that during the filtration of the copper phthalocyanine sulfate, the sulfuric acid may be removed to a large extent from the filter cake due to the coarse crystalline character of the sulfate.

When washing until neutral the copper phthalocyanine formed during hydrolisis from the copper phthalocyanine sulfate, only a small amount of dilute sulfuric acid is obtained. This reduces considerably the contamination of the waste water. But it is also possible to concentrate this acid according to the immersion heating process and to recycle it.

The sulfuric acid obtained during the filtration of the copper phthalocyanine sulfate may be used again for the purification of the copper phthalocyanine, if desired after adjusting it to the original acid concentration and after replacing the loss of sulfuric acid. By this way, the acid may be used, if required, several times without regeneration.

A more strongly contaminated sulfuric acid may be purified according to one of the known regeneration processes. As regenerating processes may be considered the Pauling process, the thermal splitting process or the distillation.

The process claimed has the special advantage that the copper phthalocyanine obtained during the hydrolisis of the copper phthalocyanine sulfate is very suitable for preparing copper phthalocyanine pigments of the $\alpha$-crystal modification. The pigment may be prepared by the action of shearing forces on the aqueous filter cake of the copper phthalocyanine obtained according to the process.

Suitable grinding devices are for example kneaders, roll mills, vibration mills or perl mills. The pigment dyestuffs obtained are characterized, as compared with the known commercial products, by a high tinctorial strength, a good dispersability and an interesting reddish brilliant shade.

The following Examples illustrate the invention. Parts and percentages are by weight unless stated otherwise.

EXAMPLE 1

100 Parts of copper phthalocyanine (in the form of a 95% commercial product, condensed according to the phthalic acid anhydride process in trichloro-benzene and boiled out with dilute hydrochloric acid) were introduced portionwise, while stirring, into 1000 parts of a 86% sulfuric acid, the temperature being increased to about 40° C. The highly viscous suspension obtained of the copper phthalocyanine sulfate was heated to 70° C and stirring for 4 hours at 70° – 80° C, whereby during the whole treatment with sulfuric acid, the air was excluded by introducing nitrogen. In the course of these 4 hours the viscosity decreased, until a low-viscous crystal suspension was obtained.

Parallely thereto may be observed a continuous growth of the copper phthalocyanine sulfate crystals, until regular crystals having a diameter of up to 1 mm were finally obtained.

After stirring for 4 hours at 70° – 80° C, 75 parts of water were slowly added dropwise at the same temperature. Then the suspension was cooled to 20°–30° C. The copper phthalocyanine sulfate was suction-filtered on an acid-proof filter material and washed with 300 parts of a 80% sulfuric acid. The suction speed of the copper phthalocyanine sulfate suspension was excellent.

The filter cake of the copper phthalocyanine sulfate was introduced, while stirring, into 1000 parts of water. Then it was suction-filtered and washed with water until neutral.

The copper phthalocyanine obtained during hydrolisis was coarsely grained and therefore, it filtered extremely quickly. It could be washed until neutral with a small amount of water. The filter cake contained about 50% of copper phthalocyanine.

94 Parts of copper phthalocyanine of the α-crystal modification having a degree of purity of 99 to 100% were obtained. When the treatment with sulfuric acid was not carried out under a nitrogen atmosphere but with admission of air, 83 to 90 parts of copper phthalocyanine were obtained.

EXAMPLE 2

300 Parts of copper phthalocyanine (in the form of the 95% commercial product described in Example 1) were introduced portionwise, in the course of one hour, into 1500 parts of a 85.8% sulfuric acid. During this process the temperature was increased slowly to 70° C. When the introduction was finished, the whole was stirred for 4 hours at 70° – 80° C under a nitrogen atmosphere. After 2 hours already, the formation of big and regular crystals began. After stirring for 4 hours at 70° – 80° C, the whole was cooled to room temperature. The coarse crystalline suspension of the copper phthalocyanine sulfate was filtered over a press. The product filtering very well was washed with a small amount of a 80% sulfuric acid. The copper phthalocyanine sulfate which was 43%, calculated on copper phthalocyanine, was hydrolized on the press and washed until neutral.

The about 50% aqueous filter cake of copper phthalocyanine obtained in this process was very suitable for preparing copper phthalocyanine pigments of the α-crystal modification. This pigment preparation was expediently carried out by preparing an aqueous suspension as concentrated as possible of the copper phthalocyanine purified according to Example 2 and subjecting this suspension subsequently to a short grinding, for example on a roll, vibration or perl mill. Since the starting material is a relatively coarse copper phthalocyanine grain, this process has the advantage that depending on the grinding conditions, more opaque or more transparent pigments can be prepared.

The 80 – 86% sulfuric acid obtained as filtrate in the process of purification may be purified, for example according to the Pauling process and subsequently recycled. The dilute sulfuric acid obtained when washing until neutral was concentrated according to the immersion heating process and then recycled.

EXAMPLE 3

100 Parts of copper phthalocyanine which contained 0.8% of bromine, having a 94% purity, were reacted according to Example 1. The reaction was carried out not in nitrogen but in an argon atmosphere. A copper phthalocyanine sulfate having an excellent filtering property was also obtained. 93.5 Parts of the copper phthalocyanine of the α-modification (content of bromine 0.8%) were obtained which were very suitable for preparing pigments.

EXAMPLE 4

100 Parts of copper phthalocyanine, which contained 3% of chlorine (in the form of a 85% crude product which was condensed according to the phthalic acid anhydride process in nitrobenzene and was partly substituted in 4-position by chlorine) were introduced portionwise into 1000 parts of a 96% sulfuric acid. The mixture was heated to 70° C. After dissolving the dyestuff, 116 parts of water were slowly added dropwise at a temperature of 70° to 75° C. Then stirring was continued for 3 hours at 70° – 75° C; the reaction was always carried out in a nitrogen atmosphere. During the three hours' treatment at 70° – 75° C big regular needles of the copper phthalocyanine sulfate were obtained by the growth of the crystals. After that, the mixture was cooled at 30°–40° C and the copper phthalocyanine sulfate was filtered. The mixture was rinsed with 400 parts of a 80% sulfuric acid. Then the filter cake was introduced, while stirring, into 1000 parts of water, suction-filtered and washed until neutral with water. 84 Parts of copper phthalocyanine were obtained which contained 3% of chlorine, having a degree of purity of 99 to 100%.

When after-treated on a vibration mill, the aqueous filter cake provided an excellent pigment of the α-modification stable to crystallization.

EXAMPLE 5

100 Parts of copper phthalocyanine, which contained 5.2% of chlorine (substitution in 3 or 4 -position of the copper phthalocyanine were reacted according to Example 4. A copper phthalocyanine sulfate which could easily be filtered was also obtained.

EXAMPLE 6

110 Parts of copper phthalocyanine (in the form of the 95% commercial product described in Example 1) were introduced portionwise into 1000 parts of a 96% sulfuric acid. The whole was heated to 70° C. After dissolving the dyestuff, 116 parts of water were slowly added dropwise at 70° – 80° C. Then the mixture was stirred for 4 hours at 70° – 80° C, and the reaction was always carried out in a nitrogen atmosphere. At 70° – 80° C, 84 parts of water were slowly added dropwise.

Then the mixture was cooled to 30° C. The big regular crystals formed in the course of the heat treatment were suction-filtered and washed with 500 parts of a 80% sulfuric acid. The filter cake was introduced while stirring into 500 parts of water, suction-filtered and washed neutral.

103.5 Parts of copper phthalocyanine of the α-crystal modification were obtained.

Instead of a 96% sulfuric acid, a 100% sulfuric acid or a 2% oleum could be used to dissolve the copper phthalocyanine. In this case only somewhat larger amounts of water were necessary to adjust an acid concentration of 86%.

EXAMPLE 7

A mixture of 100 parts of copper phthalocyanine (in the form of the 95% commercial product described in Example 1) and of 2 parts of a 100% nickel phthalocyanine were reacted according to Example 1. A growth of the first very small copper phthalocyanine sulfate particles to regular crystals were observed.

EXAMPLE 8

300 Parts of unsubstituted copper phthalocyanine (in the form of a 74% crude product, prepared according to the dinitrile baking process) were reacted according to Example 2. 218 Parts of copper phthalocyanine of the α-modification very suitable for preparing pigments were obtained.

EXAMPLE 9

300 Parts of copper phthalocyanine (in the form of the commercial product described in Example 1) were reacted according to Example 2, whereby instead of a 85.8% acid a 84.7% sulfuric acid was used. In this case the tendency to crystal growth was somewhat smaller, but a copper phthalocyanine sulfate having a good filtering property was also obtained. 282 Parts of copper phthalocyanine of the α-modification were obtained.

EXAMPLE 10

100 Parts of copper phthalocyanine (in the form of the commercial product described in Example 1) were reacted according to Example 1, but instead of a 86% sulfuric acid a 87.4% sulfuric acid was used. In this case the tendency to crystal growth was somewhat smaller, but a copper phthalocyanine sulfate having a good filtering property was also obtained.

EXAMPLE 11

100 Parts of copper phthalocyanine (in the form of the commercial product described in Example 1) were reacted according to Example 1, the growth crystals did not take place at 70° – 80° C, but at 60° C. At this temperature, very big crystals of copper phthalocyanine sulfate were obtained, but the growth of crystals was only finished after 9 to 10 hours.

In the case of an after-treatment in a 86% sulfuric acid at 90° C, the growth of crystals proceeded much more rapidly and was finished 1 to 2 hours.

EXAMPLE 12

100 Parts of semichloro-copper phthalocyanine (in the form of the 85% crude material described in Example 4) were introduced portionwise into 1000 parts of a 86.2% sulfuric acid. The suspension formed was heated to 70° C under a nitrogen atmosphere and stirred for 4 hours at 70° – 80° C, whereby regular crystal needles were formed. Then the whole was cooled to 25° C and the copper phthalocyanine sulfate was filtered. The filter cake was washed with 500 parts of a 80% sulfuric acid and washed neutral with water on the suction-filter. 94 Parts of copper phthalocyanine having a chlorine content of 3% and a degree of purity of 99 to 100% were obtained.

EXAMPLE 13

100 Parts of copper phthalocyanine (in the form of the commercial product described in Example 1) were introduced portionwise into 1000 parts of a 86% sulfuric acid. The mixture was heated to 70° C and was stirred for 4 hours under a nitrogen atmosphere at 70° – 80° C, bis crystals of copper phthalocyanine being formed. The copper phthalocyanine sulfate having an excellent filtering property was filtered at 70° – 80° C and washed with 400 parts of a 86% sulfuric acid.

200 Parts of a filter cake and 1300 parts of sulfuric acid filtrate were obtained. The filter cake was worked up according to Example 1 and provided a yield of 93 parts of copper phthalocyanine of the α-modification.

Then, 100 parts of copper phthalocyanine were reacted again according to the above data, whereby 1000 parts of the above filtrate instead of fresh 86% sulfuric acid were used. Big crystals of copper phthalocyanine sulfate having an excellent filtering property were also formed.

When repeating the procedure while using the sulfuric acid filtrate already used for two purifications, again the typical big crystals of copper phthalocyanine sulfate were formed.

Since already sulfuric acid saturated with copper phthalocyanine was used the yield of crude copper phthalocyanine was in both cases 95 parts of dyestuff of the α-modification.

EXAMPLE 14

While using in each case the sulfuric acid filtrate obtained in the purification of copper phthalocyanine, 100 parts, in each case, of copper phthalocyanine (in the form of the commercial product described in Example 1) were purified according to Example 13, the sulfuric acid concentration of the filtrate being increased by addition of 100 parts of a 100% sulfuric acid. In all cases the typical growth of the copper phthalocyanine sulfate took place.

The more strongly contaminated sulfuric acid obtained after using the filtrates for several times was regenerated by distillation.

We claim:

1. In a process for purifying an unsubstituted or halogenated copper phthalocyanine by transforming it into its sulfate and recovering it by hydrolysis with water, the improvement comprising: introducing an unsubstituted or halogenated copper phthalocyanine into (1) a 4 to 10-fold amount of sulfuric acid of an initial strength of 84 to 88% by weight, or (2) a more concentrated sulfuric acid and diluting it to said concentration range, and heating the so-obtained copper phthalocyanine sulfate in an inert gas atmosphere to a temperature of 60° to 100° C.

2. A process as claimed in claim 1, wherein the phthalocyanine is dissolved first in concentrated sulfuric acid or oleum and then diluted by addition of water, to a sulfuric acid concentration of 84 to 88%.

3. A process as claimed in claim 1, wherein the crude phthalocyanine is introduced into a 85.5 to 86.5% sulfuric acid.

4. A process as claimed in claim 1, wherein heating is continued until the viscosity of the copper phthalocyanine sulfate suspension is strongly reduced.

5. A process as claimed in claim 1, wherein the halogenated copper phthalocyanine is a chlorinated copper phthalocyanine.

6. A process as claimed in claim 5, wherein the chlorine content is up to about 6% by weight.

* * * * *